US012533671B2

(12) United States Patent
Boudoin et al.

(10) Patent No.: US 12,533,671 B2
(45) Date of Patent: Jan. 27, 2026

(54) ELECTROACOUSTIC DEVICE FOR MANIPULATING OBJECTS IN A LIQUID

(71) Applicants: UNIVERSITÉ DE LILLE, Lille (FR); CENTRALE LILLE INSTITUT, Villeneuve d'Ascq (FR); UNIVERSITÉ POLYTECHNIQUE HAUTS-DE-FRANCE, Valenciennes (FR); CENTRE NATIONAL DE LA RECHERCHE SCIENTIFIQUE, Paris (FR); YNCREA HAUTS DE FRANCE, Lille (FR); SORBONNE UNIVERSITÉ, Paris (FR)

(72) Inventors: Michaël Boudoin, Lezennes (FR); Jean-Louis Thomas, Montgeron (FR); Antoine Riaud, La Roche sur Yon (FR); Olivier Boumatar, Lille (FR)

(73) Assignees: UNIVERSITÉ DE LILLE; CENTRALE LILLE INSTITUT; UNIVERSITÉ POLYTECHNIQUE HAUTS-DE-FRANCE; CENTRE NATIONAL DE LA RECHERCHE SCIENTIFIQUE; YNCREA HAUTS DE FRANCE; SORBONNE UNIVERSITÉ

( * ) Notice: Subject to any disclaimer, the term of this patent is extended or adjusted under 35 U.S.C. 154(b) by 894 days.

(21) Appl. No.: 17/787,205

(22) PCT Filed: Dec. 14, 2020

(86) PCT No.: PCT/EP2020/086031
§ 371 (c)(1),
(2) Date: Jun. 17, 2022

(87) PCT Pub. No.: WO2021/122479
PCT Pub. Date: Jun. 24, 2021

(65) Prior Publication Data

US 2023/0021489 A1 Jan. 26, 2023

(30) Foreign Application Priority Data

Dec. 18, 2019 (EP) .................................... 19306682

(51) Int. Cl.
*B01L 3/00* (2006.01)
*B06B 1/02* (2006.01)
*B06B 1/06* (2006.01)

(52) U.S. Cl.
CPC ...... *B01L 3/502761* (2013.01); *B06B 1/0276* (2013.01); *B06B 1/0651* (2013.01);
(Continued)

(58) Field of Classification Search
CPC .. H10N 30/87; H03H 9/14561; B06B 1/0662; B01L 99/00; B01L 2200/0668; B01L 2300/0832
See application file for complete search history.

(56) References Cited

U.S. PATENT DOCUMENTS 3,609,416 A 9/1971 Epstein
4,011,747 A 3/1977 Shaw
(Continued)

FOREIGN PATENT DOCUMENTS

CN 1921301 A 2/2007
WO 2007/069574 A1 6/2007
(Continued)

OTHER PUBLICATIONS

International Search Report and Written Opinion for counterpart Application No. PCT/EP2020/086031, dated Feb. 15, 2021.
(Continued)

*Primary Examiner* — Emily P Pham
(74) *Attorney, Agent, or Firm* — The Marbury Law Group, PLLC

(57) ABSTRACT

An electroacoustic device for generating an acoustic wave includes: a piezoelectric substrate; first electrodes arranged
(Continued)

on the piezoelectric substrate, each first electrode including first tracks that spiral around a spiral axis in a first winding direction; and second electrodes arranged on the piezoelectric substrate, each second electrode including second tracks that spiral around the spiral axis in a second winding direction opposite to the first winding direction.

16 Claims, 7 Drawing Sheets

(52) U.S. Cl.
CPC .................. *B01L 2200/0663* (2013.01); *B01L 2300/0645* (2013.01); *B01L 2400/0439* (2013.01)

(56) References Cited

U.S. PATENT DOCUMENTS

| | | | | |
|---|---|---|---|---|
| 4,453,242 | A | 6/1984 | Toda | |
| 4,697,195 | A | 9/1987 | Quate et al. | |
| 5,400,788 | A | 3/1995 | Dias et al. | |
| 8,330,557 | B2 * | 12/2012 | Yamada | H03H 9/14547 333/195 |
| 2009/0114798 | A1 | 5/2009 | Tigli et al. | |
| 2010/0139377 | A1 | 6/2010 | Huang et al. | |
| 2010/0219910 | A1 | 9/2010 | Yamada et al. | |
| 2010/0298152 | A1 | 11/2010 | Brown et al. | |
| 2012/0149126 | A1 | 6/2012 | Wilson et al. | |
| 2013/0047728 | A1 | 2/2013 | Cochran et al. | |
| 2013/0192958 | A1 | 8/2013 | Ding et al. | |
| 2014/0033808 | A1 | 2/2014 | Ding et al. | |
| 2019/0091683 | A1 | 3/2019 | Baudoin et al. | |
| 2020/0316586 | A1 | 10/2020 | Riaud et al. | |
| 2020/0338593 | A1 | 10/2020 | Baudoin et al. | |
| 2021/0129149 | A1 * | 5/2021 | Ai | B01L 3/502707 |

FOREIGN PATENT DOCUMENTS

| | | | |
|---|---|---|---|
| WO | 2013/116311 | A1 | 8/2013 |
| WO | 2015/134831 | A1 | 9/2015 |
| WO | 2017/157426 | A1 | 9/2017 |
| WO | 2019/081521 | A1 | 5/2019 |

OTHER PUBLICATIONS

Baudoin, Michael, et al., "Folding a Focalized Acoustical Vortex on a Flat Holographic Transducer: Miniaturized Selective Acoustical Tweezers," arxiv.Org., Cornell University Library, XP081266324, Aug. 27, 2018, pp. 1-7.

Ding, X. et al., "On-chip manipulation of single microparticles, cells, and organisms using surface acoustic waves," Proc. Nat. Ac. Sci., vol. 109, No. 28, Jul. 10, 2012, pp. 11105-11109.

Tran, S.B.Q., et al., "Fast acoustic tweezers for the two-dimensional manipulation of individual particles in microfluidic channels," Applied Physics Letters, American Institute of Physics, 2012, 101, pp. 114103.

Non-Final Office Action for copending U.S. Appl. No. 16/085,424, dated Sep. 22, 2022.

* cited by examiner

ELECTROACOUSTIC DEVICE FOR MANIPULATING OBJECTS IN A LIQUID

CROSS REFERENCE TO RELATED APPLICATION

This is a national stage application of PCT/EP2020/086031, filed internationally on Dec. 14, 2020, which claims priority to European Application No. 19306682.6, filed on Dec. 18, 2019, which are incorporated herein by reference in their entireties.

The present invention relates to electroacoustic devices notably for manipulating objects which size is less than $10^{-2}$ m, immersed in a fluid, notably liquid, medium and in particular being denser and/or more rigid than the fluid medium.

The selective manipulation of nano-sized and micro-sized objects is a complex operation in various technical domains, such as cellular biology, microfluidic, nano- and micro-sized system assembly.

Manipulation might be performed using a tool, for instance tweezers or a micropipette. The object is then manipulated through displacement of the tool. Such a manipulating method, which is generally named "direct contact" method, is not desirable, in particular when the object is soft, or tacky, or even brittle. Furthermore, it can alter the manipulated object. Last, the introduction of the tool in a system wherein the object is located can modify the properties of the system. For instance, in case the object is submitted to an electromagnetic field, introducing the tool might create a disturbance of said field. It can also introduce some pollution. In case the system is a biological medium comprising cells, the cell behavior can be modified by the introduction of the tool.

Alternative contactless methods have been developed, such as dielectrophoresis, magnetophoresis, or optophoresis, also named "optical tweezers" method. However, all these techniques have major drawbacks. For instance, dielectrophoresis depends on the object polarizability and requires installing electrodes in the vicinity of the object to be manipulated. Magnetophoresis requires grafting of markers onto the object. Optophoresis can be used with or without grafting but is limited to very small forces by the significant heating and photo-toxicity inherent to this method.

Another method has been developed, named "standing wave acoustophoresis", which consists in implementing surface acoustic waves (SAW) generated in a substrate for manipulating an object lying or overlapping the substrate. Examples of such a method are presented in U.S. Pat. No. 7,878,063 8B1, WO 2013/116311 A1, WO 2015/134831, the article "*Fast acoustic tweezer for the two-dimensional manipulation of individual particles in microfluidic channels*", S. B. Q. Tran, P. Marmottant and P. Thibault, *Applied Physics Letters*, American Institute of Physics, 2012, 101, pp. 114103 and the article "*On-chip manipulation of microparticles, cells, and organisms using surface acoustic waves*", X. Do,g et al., Proc. Nat. Ac. Sci., 2012, 109, pp. 11105-11109.

All the known standing wave acoustophoresis methods consist in generating standing acoustic waves for manipulating objects. However, the selectivity of these methods is limited. In particular, all objects do move toward either the nodes or anti-nodes of the waves. As a consequence, the standing wave acoustophoresis methods do not allow the selective manipulation of an object independently from its neighbours.

WO 2017/157426 A1 teaches a device comprising a substrate and which is configured for generating a swirling surface acoustic wave, hereafter referred as a "SSAW", that propagates in the substrate. A support can be acoustically coupled on the substrate and a liquid medium comprising a dense and/or rigid object can be disposed onto the support. The SSAW generated in the substrate is transmitted to the support and propagates therein as an acoustical vortex or a degenerated acoustical vortex in the bulk of the support. The object which is submitted to the radiation pressure of the vortex is therefore entrapped and can be manipulated.

However, one drawback of the electroacoustic device of WO 2017/157426 A1 is that when an object is displaced by translation through the entrapping of either by the, optionally degenerated, acoustical vortex, translation comes along with rotation of the object. The rotation cannot be decoupled from the translation and thus cannot be controlled. This rotation can be detrimental since fluid forces linked to the combination of the translation and rotation of the object can result in detrapping of the object. Moreover, for some applications it is necessary to control the orientation of an object, which cannot be achieved with the device described in WO 2017/157426 A1.

There is therefore a need for an electroacoustic device that overcomes the drawbacks of the device of WO 2017/157426 A1, when manipulating through translation an object embedded in a fluid medium acoustically coupled with the device.

The invention relates to an electroacoustic device for generating at least one acoustic wave, the device comprising a piezoelectric substrate and first and second groups of electrodes arranged on the substrate, each electrode of the first and second groups comprising a track,

- the tracks of the electrodes of the first group spiralling around a same spiral axis along a first winding direction, and
- the tracks of the electrodes of the second group spiralling around said spiral axis along a second winding direction opposite to the first winding direction.

When electrically powered, the electric signals in the first and second groups of electrodes generate stress in the piezoelectric substrate. The resulting deformation of the substrate comes together with the development of acoustic waves. The interaction of the first group of electrodes with the substrate generates an acoustic wave which phase rotates in a direction around the spiral axis whereas the interaction of the second group of electrodes with the substrate generates an acoustic wave which phase rotates in an opposite direction along the spiral axis. In other words, the first group of electrodes, the second group of electrodes respectively and the substrate define a first, respectively a second wave transducer.

By selectively powering the electrodes of the first and second groups, the wave shape, which results from the interaction of the waves generated by both the first and second group of electrodes, can be adapted during manipulation of the object such as to control, and notably to prevent from, the rotation and its related undesired effect described here above. Thus, orienting the object and/or translating the object while blocking rotation of the object can be performed easily.

Preferably, the number of turn of the first and second groups of electrodes is adjusted so that when they are driven by the same electrical signal, the intensity and/or the torque applied on the trapped object differ by less than 10%. By doing so, it is possible to reduce the disequilibrium in the intensity of the acoustic vortex generated by each group of electrodes, thus it is easier to control the direction of rotation of the acoustic vortex.

In the present specification, an acoustic wave is considered to have a frequency ranging between 1 MHz and 10000 MHz.

The electroacoustic device can further present one or more of the following optional features, considered alone or as a combination.

Each electrode of the first group can comprise a contact brush, arranged on the substrate, which is connected to the corresponding track of the electrode of the first group.

The contact brushes are aimed to supply electric power to the tracks to which they are connected, by being connected for instance to a power supply apparatus.

In an embodiment, each contact brush of one of the electrodes of the first group can further be connected to the track of a corresponding electrode of the second group. In another embodiment, each electrode of the second group can comprise a contact brush, arranged on the substrate, which is connected with the corresponding track of the electrode of the second group.

The tracks of the electrodes of the first group can be arranged remotely from the contact brushes of the electrodes of the second group.

The contact brushes of the electrodes of the first group can be different from the contact brushes of the electrodes of the second group.

The track of each electrode of the first group can be in contact with the track of the corresponding electrode of the second group.

In particular, the track of each electrode of the second group can be in contact by one of its ends with one of the corresponding contact brush of the electrode of the second group and by one of its opposite ends with the track of the corresponding electrode of the first group.

The track of one of the electrodes of the second group can be partially superimposed on the contact brush of one of the electrodes of the first group and/or the track of one of the electrodes of the first group can be partially superimposed on the contact brush of one of the electrodes of the second group.

The tracks of the electrodes of the first group can spiral in an anti-clockwise direction and the tracks of the electrodes of the second group can spiral in a clockwise direction. Alternatively, the tracks of the electrodes of the first group can spiral in a clockwise direction and the tracks of the electrodes of the second group can spiral in an anti-clockwise direction.

The substrate can comprise a piezoelectric part and a dielectric layer covering the piezoelectric part and acoustically coupled with the piezoelectric part. The dielectric layer can be intended to protect the piezoelectric part.

The dielectric layer can be made of silica.

The thickness of the dielectric layer preferably ranges between 0.1 μm and 200 μm.

Two portions of the contact brush of one of the electrodes of the second group, respectively first group, can be provided on the face of the dielectric layer which is opposite to the face of the dielectric layer which faces the piezoelectric part. The two portions can be arranged on either side of the track of one of the electrodes of the first group, respectively the second group, said track being provided on the same side of the dielectric layer. The two portions are connected the one with the other with a third portion of the contact brush which is burried in a tunnel formed in the dielectric layer. The tunnel is such that a portion of the silica layer is provided in between the track of the electrode of the first, respectively second group of electrodes, and the third portion.

A portion of the dielectric layer can be sandwiched in between a portion of the contact brush of one of the electrodes of the first group, and another portion of the dielectric layer can be sandwiched in between the contact brush of one of the electrodes of the first group and a portion of the track of one of the electrodes of the second group, and/or a portion of the dielectric layer can be sandwiched in between a portion of the contact brush of one of the electrodes of the second group, and another portion of the dielectric layer can be sandwiched in between the contact brush of one of the electrodes of the second group and a portion of the track of one of the electrodes of the first group.

A portion of the contact brush of one of the electrodes of the first group, respectively of the second group, can be provided on a face of the dielectric layer and another portion of said contact brush can be provided on the opposite face, the portions of said contact brush being bridged the one with the other through a window arranged in the dielectric layer.

Preferably, at least one of the electrodes of the first group, and notably each electrode of the first group, can comprise at least one track, and/or at least one of the electrodes of the second group, and notably each electrode of the second group, can comprise at least one track.

In some embodiments, each electrode of the first group can comprise a single track which can notably comprise multiple coils. The track of one of the electrodes of the first group, notably the track of each electrode of the first group, and/or the track of electrodes of the second group, notably the track of each electrode of the second group, can comprise several coils spiralling around the spiral axis. Increasing the number of coils improves the focalization and increases the trapping force.

The electrode of the first group can comprise a radially inner coil surrounding entirely the spiral axis, and/or the electrode of the second group can comprise a radially inner coil surrounding entirely the spiral axis.

In other embodiments, each electrode of the first group can comprise at least two tracks, even at least four, even more at least six tracks. Each electrode of the second group can comprise at least two tracks, even at least four, even more at least six tracks. Each electrode of the first group can comprise the same number of tracks and/or each electrode of the second group can comprise the same number of tracks.

Increasing the number of tracks increases the trapping force.

The tracks of one of the electrodes can be all connected to the contact brush of the electrode.

The first group of electrodes can comprise at least two electrodes. It can comprise at least three, or even at least four electrodes. Each electrode of the first group can be intended to be powered with an electric signal which is different, and more especially out of phase, from the electric signal which is aimed to be applied to the other electrodes of the first group.

Notably, in some embodiments, the first group of electrodes consists of two electrodes.

The second group of electrodes can comprise at least two electrodes. It can comprise at least three, or even at least four electrodes. Each electrode of the second group can be intended to be powered with an electric signal which is different, and more especially out of phase, from the electric signal which is aimed to be applied to the other electrodes of the second group.

Notably, in an embodiment the second group of electrodes consists of two electrodes.

In an embodiment, the first group of electrodes consists of two electrodes and the second group of electrodes consists of two electrodes.

The first group of electrodes and the second groups of electrodes can define an ensemble of interdigitated electrodes. Notably, in an embodiment, each electrode of the first and second groups comprises several tracks which are interdigitated the one with another's.

In a variant, the first group of electrodes is provided radially inner to the second group of electrodes.

The track of one of the electrodes of the first group can be arranged between two tracks of another of the electrodes of the first group.

The track of one of the electrodes of the second group can be arranged between two tracks of another of the electrodes of the second group.

The tracks of one of the electrodes of the first group and the tracks of another of the electrodes of the first group can be arranged radially in an alternative manner and preferably in an adjacent manner, around the spiral axis.

The tracks of one of the electrodes of the second group and the tracks of another of the electrodes of the second group can be arranged radially in an alternative manner and preferably in an adjacent manner, around the spiral axis.

The tracks of at least one, even at least two electrodes of the second group can be arranged between the tracks of one of the electrodes of the first group and the tracks of another electrode of the second group.

The tracks of one of the electrodes of the first group can be radially arranged inside the tracks of one of the electrodes of the second group, or vice versa.

The radial step between two radially consecutive tracks of one of the electrodes of the first group and/or the radial step between two radially consecutive tracks of one of the electrodes of the second group can be constant.

The radial step between two radially consecutive coils of the track of one of the electrodes of the first group and/or the radial step between two radially consecutive coils of the track of one of the electrodes of the second group can be constant.

The radial step between two radially consecutive tracks of one of the electrodes of the first group and/or the radial step between two radially consecutive tracks of one of the electrodes of the second group can decrease radially from the spiral axis.

The radial step between two radially consecutive coils of the track of one of the electrodes of the first group and/or the radial step between two radially consecutive coils of the track of one of the electrodes of the second group can decrease radially from the spiral axis.

The radial decrease rate of the radial step between two radially consecutive tracks of one of the electrodes of the first group and the decrease rate of the radial step between two radially consecutive tracks of one of the electrodes of the second group can be different. The "radial decrease rate" of the radial step corresponds to the mathematical derivative of the radial step with respect to one predetermined radial direction. The first and second wave transducers can thus present different resonance frequency.

The electrodes of the first group and/or the electrodes of the second group can be arranged on a same face of the substrate. As a variant, the electrodes of the first group can be provided on a first face on the substrate and the electrodes of the second groups can be provided on a second face of the substrate which is opposite to the first face.

The track of one of the electrodes of the first group can be provided on a first face on the substrate and the track of another of the electrodes of the first group can be provided on a second face of the substrate which is opposite to the first face.

The track of one of the electrodes of the second group can be provided on a first face on the substrate and the track of another of the electrodes of the second group can be provided on a second face of the substrate which is opposite to the first face.

The track of one of the electrodes of the first group, notably the track of each electrode of the first group, and/or the track of one of the electrodes of the second group, notably the track of each electrode of the second group, can extend angularly around the spiral axis with an angle greater than 90°, notably greater than 180°, preferably greater than 270°, even greater than 300°.

In a first specific embodiment, the device can be configured for generating a swirling surface acoustic wave propagating in the substrate.

The swirling surface acoustic wave can present a fundamental wavelength λ ranging between $10^{-7}$ m and $10^{-3}$ m.

The swirling surface acoustic wave can be a generalized Lamb wave or preferably a generalized Rayleigh wave.

Notably, the device can comprise a support, as described herein, acoustically coupled with the substrate, the device being further configured for the swirling surface acoustic wave is transmitted to the support and propagates therein as an, optionally degenerated, acoustic vortex.

A swirling surface acoustic wave (SSAW) is a wave that propagates spinning around a phase singularity wherein destructive interferences lead to cancellation of the wave amplitude. A swirling SAW can propagate in an isotropic substrate and/or in an anisotropic substrate, as described in WO 2017/157426 A1, incorporated by reference. Each track of each electrode of the first group and of the second group can spiral along a line defined by the equation $$R(\Theta)=\frac{\varphi_0-\omega\mu_0(\Theta)+\alpha\left(\acute{\psi}(\Theta)\right)-\frac{\pi}{4}\mathrm{sgn}\left(h''\left(\acute{\psi}(\Theta),\Theta\right)\right)-l\Theta}{\omega s_r\left(\acute{\psi}(\Theta)\right)\cos\left(\acute{\psi}(\Theta)-\Theta\right)}$$

wherein:

$R(\theta)$ is the polar coordinate of the line with respect with the azimuthal angle $\theta$, $\varphi_0$ is a free parameter, 1 is the vortex order of a swirling SAW of pulsation $\omega$, 1 being an integer such that $|1|\geq 1$.

$\mu_0(\theta)$ is given by:

$$\mu_0(\Theta)=\sum_{i=1}^{n}s_z^{(i)}(\Theta)(z_i-z_{i-1})$$

where $z_i-z_{i-1}$ is the distance between two successive interfaces separating materials stacked onto the substrate, $z_0$ being the height of the interface between the substrate and the layer contacting the substrate, $\mu_0$ $(\theta)=0$ in case of the absence of stacked layers $h''(\Psi)$ is $$\frac{\partial^2}{\partial\psi^2}[s_r(\psi)\cos(\psi-\Theta)]$$

evaluated at $\psi=\psi$ where $\psi$ depends on $\Theta$ as follows:

$$\psi'(\Theta) = \Theta + \operatorname{atan2}\left(\frac{s_r'(\Theta)}{\sqrt{s_r'^2(\Theta) + s_r^2(\Theta)}}, \frac{s_r(\Theta)}{\sqrt{s_r'^2(\Theta) + s_r^2(\Theta)}}\right)$$

$s_r(\psi)$ is the wave slowness on the surface plane of the substrate in the direction of propagation $\psi$, and $s_z(\psi)$ is the wave slowness in the out of plane direction, a wave slowness in a direction i being r or z being computed from the wavenumber $k_i$ as $s_r(\psi)=k_r(\psi)/\omega$: and $s_z(\psi)=k_z(\psi)/\omega$ $s_r'(\psi)$ is the derivative of $s_r(\psi)$ in respect to the direction of propagation, $\alpha(\psi)$ is the phase of the vertical motion of the wave propagating in direction $\psi$ versus the associated electric field.

The first transducer can be configured for generating a first SSAW and the second transducer can be configured for generating a second SSAW. In some embodiments, the fundamental wavelengths of the SSAW generated by the first and second transducers can be equal. In some other embodiments, they can be different.

The first wave transducer can present a resonance frequency which is different from the second wave transducer. As it will be more apparent later, by choosing appropriately the frequency of the electric signal(s) to be applied to the first and to the second group of electrodes, one can easily control the rotation of the object when it is submitted to the acoustic wave generated by the device.

The radial step between two radially consecutive tracks of one of the electrodes of the first group and/or radial step between two radially consecutive tracks of one of the electrodes of the second group can be constant.

In a variant, the radial step between two radially consecutive coils of the track of one of the electrodes of the first group and/or radial step between two radially consecutive coils of the track of one of the electrodes of the second group can be constant. Moreover, the radial step between two radially consecutive coils of the track of one of the electrodes of the first group and radial step between two radially consecutive coils of the track of one of the electrodes of the second group can be constant and different.

Said radial step ($\Delta$) can be comprised between 0.48 $\lambda$ and 0.52 $\lambda$, preferably equal to $\lambda/2$, $\lambda$ being the fundamental wavelength of the swirling ultrasonic surface wave generated by the first wave transducer, respectively the second transducer.

In a second specific embodiment, the device is configured for generating a focused acoustic vortex. The device can be configured for the focused acoustic vortex to propagate in the support. In a variant, the device comprises a support, as described herein, acoustically coupled with the substrate, the focused acoustic vortex propagating in the support. In a last variant, the focused acoustic vortex propagates in a fluid, notably a liquid, medium when the fluid medium is acoustically coupled with the device.

The electroacoustic device is not configured to synthesize a surface acoustic wave propagating in the piezoelectric substrate as compared to the vortex depicted in WO 2017/157426 A1. The electroacoustic device is such that the focalized acoustic vortex secondary rings magnitude decreases faster radially than the cylindrical acoustic vortex or degenerated acoustic vortex generated by the device of WO 2017/157426 A1. Furthermore, when an object is entrapped in the zone of lowest acoustic intensity of the focalized acoustic vortex, it can be manipulated along a direction parallel to the spiral axis. Last, considering the same object to be manipulated, the force applied to the object by implementing the electroacoustic device of the invention can be greater than with the device taught in WO 2017/157426 A1, since the energy is focalized in three dimensions. Last, in a plane transverse to the spiral axis, the pressure can be anisotropically distributed.

The liquid medium can be aqueous, for instance water. It can be a saline based medium, adapted for maintaining the physical integrity of a biological material.

Preferably, the distance between two radially consecutive tracks of one of the electrodes of the first group decreases radially from the spiral axis and/or the distance between two radially consecutive tracks of one of the electrodes of the second group decreasing radially from the spiral axis.

Preferably, the distance between two radially consecutive coils of the track of one of the electrodes of the first group decreases radially from the spiral axis and/or the distance between two radially consecutive coils of the track of one of the electrodes of the second group decreasing radially from the spiral axis.

Preferably, the fundamental wavelength of the acoustic vortex generated by the device in the fluid medium can range between 100 nm and 10 mm.

The electrodes of the first group, respectively the electrodes of the second group, can comprise hot electrodes intended to be powered and ground electrodes intended to be grounded. The hot electrodes and the ground electrodes of the first group, respectively of the second group, can be arranged alternatively along a radial direction.

In a variant, the first group of electrodes, respectively the second group of electrodes, can comprise a first hot electrode and a second hot electrode which are intended to be powered with different electric signals, for instance out of phase the ones with the others. In addition, the device can comprise a first ground electrode, respectively a second ground electrode, intended to be grounded.

The first group of electrodes, respectively the second group of electrodes can be arranged on one side of the substrate and the second group of electrodes, respectively the first group of electrodes can be arranged on an opposite side of the substrate. The first ground electrode, respectively the second ground electrode can be arranged in between two adjacent first hot electrodes and second hot electrodes of the first group, respectively second group.

For instance, the first ground electrode, respectively the second ground electrode can be a coating superimposed with the first hot electrode and the second hot electrode of the first group, respectively of the second group. The first ground electrode, respectively the second ground electrode, can comprise a track spiralling around the spiral axis, and which can overlap the track of the first hot electrode and/or the track of the second hot electrode of the first group, respectively of the second group.

The first and second ground electrodes can be provided on the same face of the substrate. They can share a same contact brush or can be connected to a same contact brush.

In a variant, the first ground electrode can be the second ground electrode and vice versa.

The first ground electrode can be provided on a face of the substrate opposite to the face on which the electrodes of the second group are arranged and/or the second ground electrode can be provided on a face of the substrate opposite to the face on which the electrodes of the first group are arranged.

The width of at least one hot electrode of the first group, respectively of the second group, can radially vary from the spiral axis. The amplitude of the focalized ultrasonic vortex can thus be modified. Notably, along a radial direction, the width of a radially inner track of said hot electrode can be greater than the width of an adjacent radially outer track.

The ground electrode and/or the hot electrode can be coated with an electrically isolating material, preferably in the form of a quarter wavelength layer. A quarter wavelength layer enhances the transmission of the acoustic wave.

In particular, at least one of the track, and notably all the tracks of the electrodes of the first group and/or at least one of the track, and notably all the tracks of the electrodes of the second group draws a line along a polar coordinate R(θ), as illustrated on FIGS. 11 and 12, from a center C, said polar coordinate being obtained by solving the equation (i)

$$\psi_0 = \mu^{(N)}\left(\overline{\psi} + \pi, -\overline{\sigma}_N\right) - \alpha\left(\overline{\psi} + \pi, -\overline{\sigma}_N\right) + \omega s_{ref} h\left(\theta, \varphi, \overline{\psi}, \overline{\sigma}_N\right)\sqrt{R^2 + z^{(N)^2}} + \frac{\pi}{4}\zeta \tag{i}$$

wherein $$\tan\varphi = -\frac{R}{z^{(N)}}, \tag{ii}$$

with $z^{(N)}$ being the distance along axis Z between the face of the piezoelectric substrate on which the electrode of the first group, respectively the electrode of the second group is provided and the focal locus 2 of the vortex as illustrated on FIG. 11,

- $\psi_0^{(R)}$ is the phase of the electric potential coupled to the vortex by piezoelectric effect at height along axis Z on the plane where the electrode of the first group, respectively the electrode of the second group is provided; equation (i) is solved when this phase is constant along an electrode,
- $\mu^{(N)}(\overline{\psi}+\pi,-\overline{\sigma}_N)$ is the phase of the angular spectrum at the focal locus of the vortex with $\overline{\psi}$ and $\overline{\sigma}_N$ being beam stirring angles, preferably $\mu^{(N)}=-m\overline{\psi}$, with m being a positive integer number,
- $\alpha(\overline{\psi}+\pi,-\overline{\sigma}_N)$ is the piezoelectric coupling coefficient,
- ω is the wave pulsation of the vortex,
- $S_{ref}$ is a reference speed, for instance equal to the average sound speed in the piezoelectric substrate,
- $h(\Theta,\sigma,\psi,\sigma_N)$ is the dimensionless fly time of the wave, which reads $$h = \frac{1}{s_{ref}}\left(s_r(\psi, \sigma_0(\sigma_N))\sin\varphi\cos(\psi-\theta) + \cos\varphi\sum_{n=0}^{N-1} s_z^{(n)}(\psi, \sigma_n(\sigma_N))\gamma_n^{n+1}\right) \tag{iii}$$

where $$\gamma_n^{n+1} = \frac{z^{(n+1)} - z^{(n)}}{z^{(N)}},$$

with $z^{(n)}$ being the distance between the first interface of a material n stacked onto the piezoelectric substrate and the plane containing the electrode of the first group, respectively the electrode of the second group, in case n medium are stacked onto the piezoelectric substrate, n=0 corresponding to the plane containing the electrode of the first group, respectively the electrode of the second group,

- $s_r(\psi,\sigma_0(\sigma_N))$ and $s_z^{(n)}(\psi,\sigma_n(\sigma_N))$ being the components of the wave slowness vector in the cylindrical coordinate system with the propagation direction being referred by angles ψ and α; $s_r(\psi,\sigma_0(\sigma_N))$ is independent of the material due to propagation laws, and is for instance chosen as being equal to $s_r^{(0)}(\psi,\sigma_0(\sigma_N))$ which is the radial component of the wave slowness in the piezoelectric part; each wave, which forms the vortex by interference of multiples waves, propagates in medium n along a direction expressed with angles ψ and $\sigma_n$ being the azimuthal and inclination angles respectively from axis Z measured from the focal locus of the vortex, and $\sigma_0$ being the refraction angle of the material constitutive of the piezoelectric substrate; Angle ψ is independent from the material wherein the wave propagates while the refraction angle $\sigma_n$ is obtained by solving the Snell-Descartes relationship $$s^{(n)}(\psi,\sigma_n)\sin\sigma_n = s^{(N)}(\psi,\sigma_N)\sin\sigma_N \tag{iv}$$

a man skilled in the art knows how to compute the slownesses from the material's properties for any kind of wave using solid acoustics methods well known in the art;

$s_z^{(n)}$ is given by the following dispersion relationship $$s_z^{(n)}(\psi,\sigma_n) = \sqrt{s^{(n)}(\psi,\sigma_n)^2 - s_r(\psi,\sigma_0(\sigma_N))^2} \tag{v}$$

and $$\frac{\pi}{4}\zeta$$

is the Gouy phase of the vortex, wherein ζ is the signature, i.e. the difference between the number of positive eigenvalues and the number of negative eigenvalues of the Hessian matrix A of function h evaluated at $\overline{\psi},\overline{\sigma}_N$ $$A = \left.\begin{pmatrix} \frac{1}{\sin^2\sigma_N}\frac{\partial^2}{\partial\psi^2}h & \frac{1}{\sin\sigma_N}\frac{\partial^2}{\partial\psi\partial\sigma}h \\ \frac{1}{\sin\sigma_N}\frac{\partial^2}{\partial\psi\partial\sigma}h & \frac{\partial^2}{\partial\sigma^2}h \end{pmatrix}\right|_{\overline{\psi},\overline{\sigma}_N} \tag{vi}$$

To solve equation (i), once the 4 variable function $h(\theta,\varphi,\psi,\sigma_N)$ is obtained, the beam stirring angles $\overline{\psi},\overline{\sigma}_N$ are obtained, using numerical well known methods, as solutions of the following differential equation systems $$\begin{cases} \frac{\partial}{\partial\sigma_N}h = 0, \\ \frac{1}{\sin\sigma_N}\frac{\partial}{\partial\psi}h = 0. \end{cases} \tag{vii}$$

The device can comprise a stack comprising in succession the piezoelectric substrate, the support and optionally at least one other support stacked onto the support. In order to define the shape of the electrode of the first group, respectively the electrode of the second group by resolving the system of equations (i) to (viii), the following method can be implemented, comprising the successive steps of:

- computing the slowness in each material of the stack, by standard methods well known by a skilled worker, i.e. the piezoelectric substrate and/or the support and/or the other support(s), computing the refraction angles $\sigma_n$ as solutions of equation (iv) and the z-component of the wave slowness vector in each constituent (n) of the stack as solution of equation (v), computing the function h as solution of equation (iii), computing $\overline{\psi},\overline{\sigma}_N$ as solutions of equation (vii), evaluating the Gouy phase as solution of equation (vi), computing function $\psi_0(R)$ and evaluating $R(\theta)$.

In equation (i), every leap of $2\pi$ in angle $\psi_0$ yields a line of a new electrode of the first group, respectively electrode of the second group having the same polarity. The inverse polarity is provided with a leap of $\pi$.

For instance, the stack can consist of a piezoelectric substrate and a support, the support being thicker, preferably five times thicker, than the piezoelectric substrate, and made of a an isotropic material, and the electrode of the first group, respectively the electrode of the second group draws a line along a polar coordinate $R(\theta)$, from a center C which equation is $$R(\theta) = \sqrt{\left(\frac{\psi_0 + m\theta}{\omega s}\right)^2 - z^{(N)2}} \quad \text{(viii)}$$

Equation (viii) is obtained as an analytic solution of the sets of equations (i) to (vii) with $s_r(\psi,\sigma)=s$ ins $\sigma$ and $s_z(\psi,\sigma)=s\cos\sigma$, s being the slowness of the vortex in the support material and $\alpha$ being a constant having no influence on $\psi_0^{(R)}$. In such case, solving equation (vi) yields $\overline{\psi}=\theta$ and $\overline{\sigma}=\varphi$. Further, $h(\overline{\psi},\overline{\sigma})=1$ and A is identity matrix, the Gouy phase being $\pi/2$ and can be discarded since it is a constant that has no influence of the level set $\psi_0^{(R)}$. In other words, in equation (viii), $\psi_0$ is a constant.

The electrodes of the first group and/or the electrodes of the second group and, if appropriate, the first and/or second ground electrodes, can be made from a metallic material, notably chosen among gold, silver, aluminium and their mixtures. Aluminium is preferred for applications at frequency higher than 100 MHz. Gold and/or silver are preferred when a good conductivity is required.

The electrodes of the first group and/or the electrodes of the second group can be deposited onto the substrate by photolithography. In particular, a layer of a material comprising chromium or titanium might be deposited onto the substrate before depositing the electrodes in order to improve the adherence of the electrodes on the substrate.

The substrate can be a plate having a thickness greater or equal than 500 μm.

As previously described, the substrate can comprise or consist in a piezoelectric part. The piezoelectric part can be made of an anisotropic material, preferably chosen among lithium niobiate, lithium titanate, quartz, zinc oxide, aluminum nitride, lead titano-zircanate, and their mixtures.

The substrate can be at least partially made of a non-opaque, preferably a transparent material.

The substrate can be mounted rotatable on a pivot around a rotation axis.

As described here above, the device can comprise a support acoustically coupled with the substrate. The support can overlap the first group and second group of electrodes and the substrate.

The support can be made at least partially of a non-opaque and preferably transparent material.

The support can be made of a non-piezoelectric material.

The support can be made of an isotropic material with respect to the propagation of an ultrasonic wave.

The support can comprise a material chosen among a glass and a polymer, in particular a thermoplastic, most preferably polymethylmethacrylate (PMMA). Notably, the support can be made of glass.

The support can be stationary relative to the substrate. For instance, it is glued to the substrate.

The device can comprise a layer made of a coupling medium sandwiched in between the substrate and the support. The coupling medium is for instance an optical adhesive, such as NOA61 of Norland Product.

The first group of electrodes and/or the second group of electrodes can be sandwiched in between the substrate and the support.

The electroacoustic device can comprise a base, preferably made of a non-piezoelectric material, which is disposed on the support and/or the substrate.

The base can be made at least partially of a non-opaque, preferably a transparent material, notably made of glass.

The base can be in the form of a layer deposited onto the substrate and/or the support.

The substrate and/or the support can be part of an objective of a microscope or can be part of a device configured to be fixed to an objective of a microscope.

The device can comprise an organ configured for displacing the support relatively to the transducer, preferably by translation along anyone of two axis both perpendicular, and parallel to the substrate.

Furthermore, the device can be disk shaped. The device can comprise a visual marking located in the central zone of the substrate, for instance made of the same material as the first and second tracks.

The device can be connected to a power supply apparatus. The connectors of the first group, and if appropriate of the connectors of the second group are connected to the power supply apparatus.

The power supply apparatus can be configured for electrically powering the electrodes of the first and second groups respectively such as to generate acoustic waves, notably having each a fundamental frequency ranging between 100 KHz and 10 GHz, in the piezoelectric substrate.

Furthermore, the invention also relates to a process, according to one of its aspects, for manipulating an object embedded in a fluid, notably liquid, medium, comprising the following steps of:

generating at least one, optionally degenerated, acoustic vortex with the device according to the first specific embodiment of the invention or a focused acoustic vortex with a device according to the second specific embodiment of the invention, propagating said, optionally degenerated, acoustic vortex or said focused acoustic vortex in the fluid medium such as to create a radiation pressure wherein the object is submitted, and manipulating the object by displacement of the electrodes of the first group and of the electrodes of the second group relatively to the fluid medium.

The invention also relates, according to another of its aspects, to a process comprising the following steps of:

generating at least one, optionally degenerated, acoustic vortex with the device according to the first specific embodiments of the invention or a focused acoustic vortex with a device according to the second specific embodiments of the invention, propagating said, optionally degenerated, acoustic vortex or said focused acoustic vortex in a fluid, notably liquid, medium such as to generate a vortical flow of the fluid medium.

For instance, the vortical flow can promote mixing of the fluid medium.

Whatever the aspect of the invention, the process can present any of the following features, considered alone or as in a combination.

The object has preferably a size which is less than $10^{-2}$ m.

The object is preferably dense and/or more rigid than the fluid medium.

The object can be a biological material. The biological material can be mobile in the fluid medium, in the absence of acoustic wave. It can comprise one or more cells. For example, it is a ciliated microorganism, a spermatozoid or an oocyte. Preferably, the object is label free. The, optionally degenerated, acoustic vortex or the focused acoustic vortex respectively can be generated by electrically supplying at least one of the electrodes of the first group, respectively of the second group, with a master signal and at least another one of the electrodes of the first group, respectively of the second group, with a slave signal.

The first and second wave transducers can have different resonance frequencies, and the generation of the optionally degenerated, acoustic vortex or of the focused acoustic vortex can comprise the supply of at least one set of master and slave electric signals adapted for exciting the first and second wave transducers with a frequency ranging between the resonance frequencies of the first and second wave transducers.

The amplitude of the first master signal and/or of the first slave signal supplied to the corresponding electrodes of the first group, and the amplitude of the second master signal and/or of the second slave signal supplied to the corresponding electrodes of the second group, respectively, can be different.

The frequencies of the first master signal and/or of the first slave signal supplied to the corresponding electrodes of the first group, and the frequencies of the second master signal and/or of the second slave signal supplied to the corresponding electrodes of the second group, respectively, can be different.

By controlling the amplitudes and/or the frequencies of the signals supplied to the first and second group of electrodes, one can control the relative effects of the first and second wave transducers, for instance such as to prevent the rotation of an object entrapped by the acoustic wave.

In particular, the step of manipulating the object can comprise:

- controlling the rotation of the object around itself, notably preventing the rotation of the object around itself, and/or
- controlling the translation of the object, notably preventing the translation of the object.

More especially, the step of manipulating the object can comprise immobilizing the object, notably in the variant wherein the object is a biological material mobile in the fluid medium in the absence of acoustic wave, for instance a ciliated microorganism or a spermatozoid.

In a variant, the frequency of the master signal and/or of the slave signal supplied to the corresponding electrodes of the first group, and the frequency of the master signal and/or of the slave signal supplied to the corresponding electrodes of the second group, can range between the resonance frequency of the first wave transducer and resonance frequency of the second wave transducer.

In another variant, the master and slave signals supplied to the first and second groups of electrodes can comprise wave packets.

The duration of a wave packet of the master signals supplied to the first and second groups of electrodes can be different, and/or the duration of a wave packet of the slave signals supplied to the first and second groups of electrodes can be different.

The supply of master and slave signals to the first group of electrodes can alternate in time with the supply of master and slave signals to the second group of electrodes. Notably, when the electrodes of the first group are supplied with a wave packet, the electrodes of second group can be off, and vice-versa.

The manipulation step can comprise at least one of:

- translation the object from one initial position toward a final position,
- rotation of the object from one initial orientation toward a final orientation; the orientation is for instance measured by an angle between a specific direction of the object, for instance the extension direction of the object; at the final orientation, the object is preventing from rotating, but can be translated.

Furthermore, the amplitude and/or frequencies and/or duration of wave packets of the master signal and/or of the slave signals can be adapted to supress, notably completely, the rotation of the object around the spiral axis while enabling the translation of the object.

The invention also relates to the use of the electroacoustic device of the invention for generating an optionally degenerated, acoustic vortex or a focalized ultrasonic vortex.

The focalized ultrasonic vortex can be isotropic or anisotropic. In particular, it can be spherical.

For instance, a "spherical vortex" propagating in an "isotropic medium" is defined through equation (ix):

$$W_n^m(\theta,\varphi,\rho)=e^{-i\omega t}j_n(k\rho)Y_n^m(\varphi,\theta), \quad \text{(ix)},$$

and a "spherical vortex" propagating in an "anisotropic medium" is defined through equation (x):

$$W_n^m(\theta,\varphi,\rho)=\frac{e^{-i\omega t}}{4\pi i^n}\int_{\sigma=0}^{\pi}\int_{\psi=-\pi}^{\pi}Y_n^m(\sigma,\psi)e^{i\vec{k}\cdot\vec{\rho}}\sin\sigma\, d\sigma\, d\psi, \quad \text{(x)}$$

where:

- $(\theta,\varphi,\rho)$ are spherical coordinates in the Cartesian coordinate system (x,y,z) as shown on FIG. 11, $\theta$ being the azimuthal angle and $\varphi$ the inclination angle from axis z and $\rho$ a radius along azimuthal angle $\theta$ and inclination angle $\varphi$ from the focal locus of the vortex,
- $\sigma$ and $\psi$ are the analogs of $\psi$ and $\theta$ respectively for the propagation of the vortex in the reciprocal space, $$Y_n^m(\varphi,\theta)=\sqrt{\frac{(2n+1)}{4\pi}\frac{(n-m)!}{(n+m)!}}P_n^m(\cos\varphi)e^{im\theta}$$

is the spherical harmonic of degree n and order m, and $j_n$ is the spherical Bessel function of order n and $P_n^m$ the associated Legendre polynomial.

A "radial" direction is perpendicular to the spiral axis.

A "radial" plane comprises both the spiral axis and one radial direction.

A "transverse" plane is perpendicular to the spiral axis.

A "radially inner" part is closer to the spiral axis than a "radially outer" part along a radial direction.

A "coil" of a spiral is a part of a spiral which extends angularly around the spiral axis of an angle of at least 360°.

The "thickness" of a part is measured along a direction parallel to the spiral axis.

Among a plurality of electrode possibly provided on both faces of a piezoelectric substrate, when observed projected along the spiral axis a transverse cross section of the piezoelectric substrate, a second electrode "adjacent" to a first electrode is the electrode which radial distance from the first electrode is the lowest. The same goes with a coil of a spiral. According to this definition, a first electrode provided on a face of the piezoelectric substrate can be adjacent to a second electrode provided on the opposite face of the piezoelectric part.

The invention can be better understood from a reading of the detailed description that follows, with reference to exemplary and non-limiting embodiments thereof, and by the examination of the appended drawing, in which.

Figure 1:
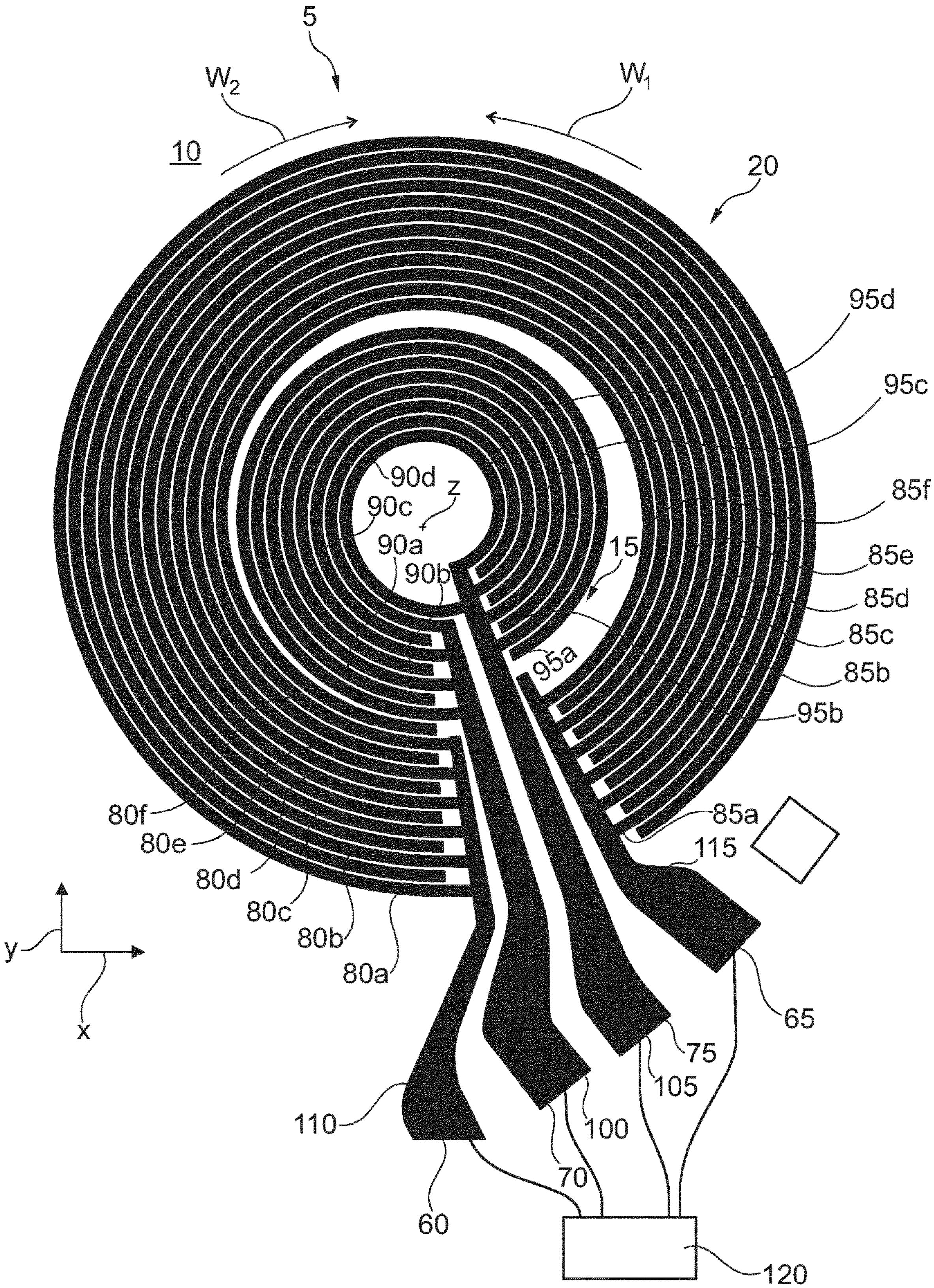
FIG. 1 illustrates, from a front view along the spiral axis, of a portion of a first example of a device according to the invention.

In the drawing, the respective proportions and sizes of the different elements are not always respected for sake of clarity.

FIG. 1 illustrates an electroacoustic device 5 according to the invention.

The device comprises a substrate 10 and first 15 and second 20 groups of electrodes arranged on a face of the substrate.

The substrate comprises a part 25 made of a piezoelectric material and a dielectric layer 30 made of silica which contacts and overlaps the part. It is shaped as a plate parallel to a plane defined by directions X and Y. The substrate has for instance a thickness $e_s$ equal to 120 µm, and presents an upper face 35 and a lower face 40. It is for instance made of $LiBNO_3$ Y-cut at 35°. The two groups of electrodes are provided on the upper face of the substrate. In a variant, they can be arranged on opposite faces of the substrate.

The first group of electrodes and the substrate defines a first wave transducer 45 and the second group of electrodes and the substrate defines a second wave transducer 50.

Each electrode 60, 65, 70, 75 of the first and second groups comprises several tracks $\mathbf{80}_{a-f}$, $\mathbf{85}_{a-f}$, $\mathbf{90}_{a-d}$, $\mathbf{95}_{a-d}$. Each track spirals around a same spiral axis Z which is normal to the plate.

The tracks 90, 95 of the electrodes of the first group spiral around a same spiral axis Z along a first winding direction, as indicated by curved arrow $W_1$, and the tracks 80, 85 of the electrodes 60, 65 of the second group spiralling around said spiral axis along a second winding direction, as indicated by curved arrow $W_2$, which is opposite to the first winding direction $W_1$. The tracks 90, 95 of the electrodes of the first group spiral in an anti-clockwise direction whereas the tracks 80, 85 of the electrodes of the second group spiral in a clockwise direction. The spiral axis Z is perpendicular to the substrate upper face which supports the first and second groups of electrodes.

The tracks 90, 95 of the electrodes 70, 75 of the first group are provided radially inner from the tracks 80, 85 of the electrodes 60, 65 of the second group.

Figure 3:
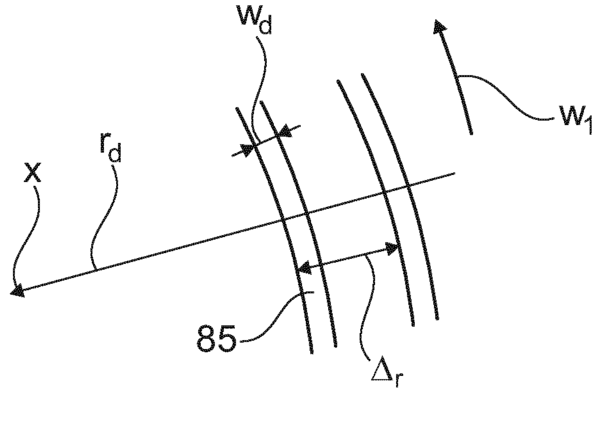
FIG. 3 illustrates some other features of the tracks of the electrodes of the example illustrated on FIG. 1.

As illustrated on FIG. 3, each track has a width $w_d$, measured along a radial direction $r_d$, which is less, for instance at least 10 times less, even at least 100 times less, than the length of the track, the length being measured along the first, respectively second winding direction.

The first group consists in first 70 and second 75 electrodes, each comprising one contact brush 100, 105 and four tracks $\mathbf{90}_{a-d}$, $\mathbf{95}_{a-d}$, and the second group consists in two electrodes 60, 65, each comprising two contact brushes 110, 115 and six tracks $\mathbf{80}_{a-f}$, $\mathbf{85}_{a-f}$. Such a number of tracks is nevertheless not limitative and can be adapted depending on the desired shape of the wave front to generate.

Each track of each electrode of the first and second group extends around the spiral axis with an angle greater than 300°, from the contact brush it is in contact with.

The tracks of the first electrode and the tracks of the second electrode of the first group, respectively the second group, are arranged in an alternating manner, radially from the spiral axis.

The tracks of the electrodes of the first group are at a distance of the contact brushes of the electrodes of the second group and vice-versa. Moreover, the tracks of the first electrode of the first group are at a distance from the tracks of the second electrode of the first group, and the tracks of the first electrode of the second group are at a distance from the tracks of the second electrode of the second group.

In addition, each of the four contact brushes is connected to a power supply apparatus 120 which is aimed at providing to every electrode a specific electric signal, at it will be explained in more detail here below.

In the example of FIG. 1, the radial step $\Delta_r$ between two consecutive tracks of each of the electrodes of the first and second group is constant, and the device is adapted to generate a SSAW. As it observed on FIG. 3, the radial step is defined by the radial distance between the radially inner edge of a coil or of a track and the radially inner edge of the consecutive coil of track.

Figure 2:
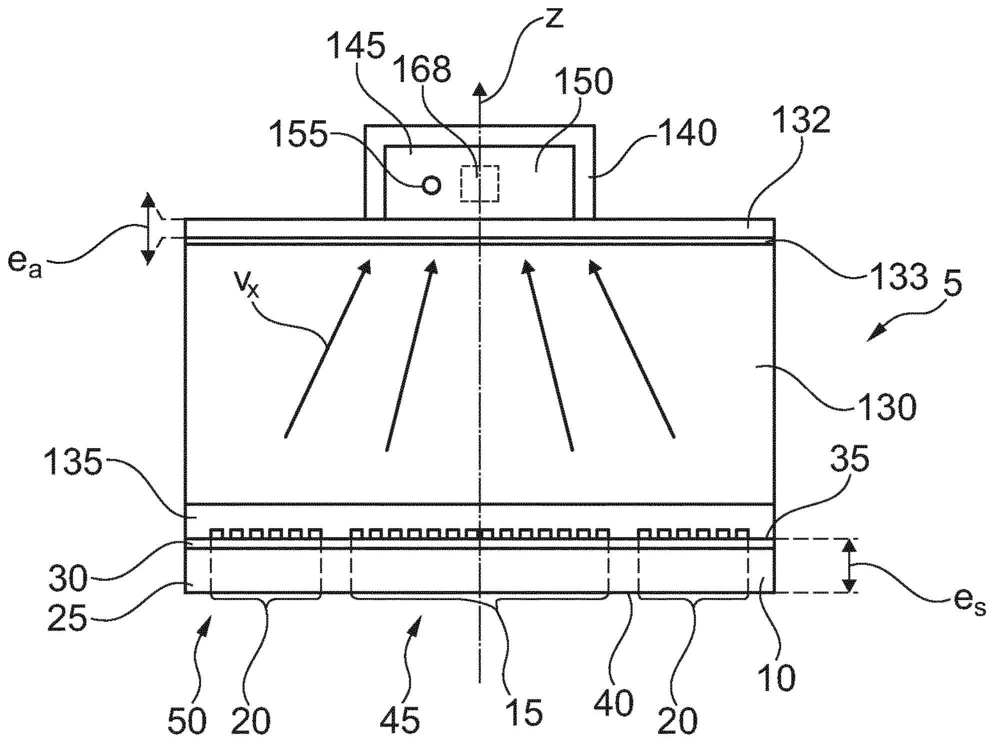
FIG. 2 is a cross section view of the electroacoustic device illustrated on FIG. 1.

Moreover, as observed on FIG. 2, the device comprises a support 130 which is acoustically coupled to the substrate. The electrodes are arranged between the support and the substrate. The support is acoustically coupled to the piezoelectric part by means of a layer of a coupling medium 135, for instance optical adhesive NOA61 of Portland Product.

The device further comprises a base 132 disposed on the upper face of the support. The base is a plate made of borosilicate glass of thickness $e_a$ of 150 µm. It can be moved in at least two directions transverse to the spiral axis. An interface liquid 133 of thickness less than 10 μm is provided between the base and the support, such as to acoustically couple the base with the support and such that the base can be displaced relatively to the support without damaging the support.

A sound absorber 140 made for instance of PDMS is provided on the base, which defines a cavity 145 containing a fluid medium 150, preferably a liquid medium. An object 155 is embedded in the fluid medium.

When the electrodes of both the first and second groups are electrically supplied, a SSAW is generated by the device and propagates at the surface of the substrate. It is transmitted in the bulk of support, but the swirling SAW degenerates at the interface between the substrate and the support in an acoustic vortex or in a degenerated acoustic vortex propagating in the bulk of the support and in the liquid medium, as illustrated by arrow Vx.

The radiation pressure associated with the vortex concentrates in a volume represented by the dashed square 168, which is located perpendicularly to the substrate and substantially aligned with the spiral axis Z.

The object 155, when located in the vicinity of said volume represented by the dashed square 168, also named "3D trap", if having a size comparable to the wavelength of the swirling SAW, is submitted to attraction forces which aims at entrapping said object in the 3D trap.

By displacing the base relatively to the support, the object can be brought close to the spiral axis. It can then be manipulated and notably be entrapped along the spiral axis.

In a variant, the tracks of the electrodes can be disposed on a face of the substrate which is opposite to the face regarding the support. The swirling wave can be either a Lamb wave or a bulk wave.

In order to control the rotation of the object, and notably to prevent the object from any rotation, the device illustrated on FIGS. 1 and 2 is electrically supplied by the power supply apparatus 120.

Power supplying can be performed in the following ways.

The power supply apparatus can deliver one of the electrodes of the first group, respectively of the second group, with a master electric signal and the other electrode of the first group, respectively of the second group, with a slave electric signal which is out of phase with the master electric signal.

Preferably, the amplitudes of the master electric signal and of the slave electric signal supplied to the first group of electrodes, respectively to the second group of electrodes, are equal. Preferably, the frequencies of the master electric signal and of the slave electric signal supplied to the first group of electrodes, respectively to the second group of electrodes, are equal.

Figure 4:
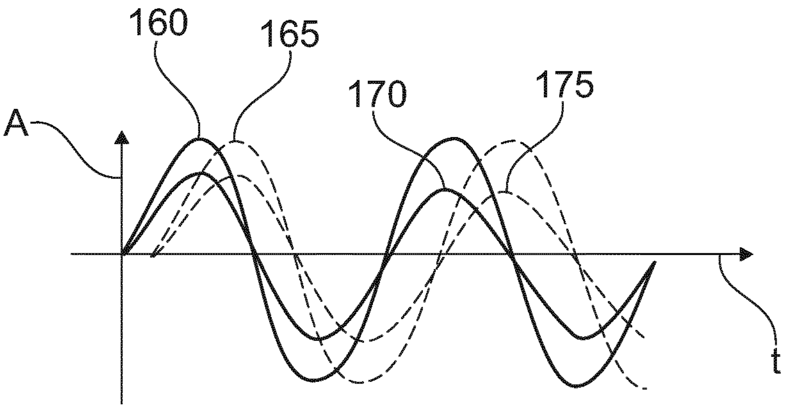
FIGS. 4 and 5 show the evolution with time t of the amplitude A of master and slave signals supplied to electrodes of the first and second groups of the device illustrated on FIG. 1, according to some examples of implementation.

In a first implementation of the device, as illustrated on FIG. 4, the amplitude A of the master electric signal 160, respectively to the slave electric signal 165, supplied to the first group of electrodes is different from the amplitude A of the master electric signal 170, respectively to the slave electric signal 175, supplied to the second group of electrodes.

In a second example of implementation of the device, the frequency of the master electric signal, respectively of the slave electric signal, supplied to the first group of electrodes is different from the frequency of the master electric signal, respectively of the slave electric signal, supplied to the second group of electrodes.

In a third example of implementation, the frequency of the master electric signal, respectively of the slave electric signal, supplied to the first group of electrodes and the frequency of the master electric signal, respectively of the slave electric signal, supplied to the second group of electrodes are both ranging between the resonance frequency of the first wave transducer 45 and the resonance frequency of the second wave transducer 50. By appropriately tuning said signal frequencies, the user of the device can modulate the relative effect of both first and second wave transducers.

Preferably, the frequencies of the master and slave electric signals supplied to the first and second group of electrodes are equal. Preferably, the amplitudes of the master and slave electric signals supplied to the first and second group of electrodes are equal.

A man skilled in the art knows how to determine the resonance frequency of a wave transducer, either by computation or by appropriate measurement techniques.

Having wave transducers presenting both different resonant frequencies can be achieved notably by the radial step between two consecutives tracks of one of the electrodes of the first group, or the radial step between two consecutive coils of the track of one of the electrodes of the first group, being different from the radial step between two consecutives tracks of one of the electrodes of the second group, or the radial step between two consecutive coils of the track of one of the electrodes of the second group.

Figure 5:
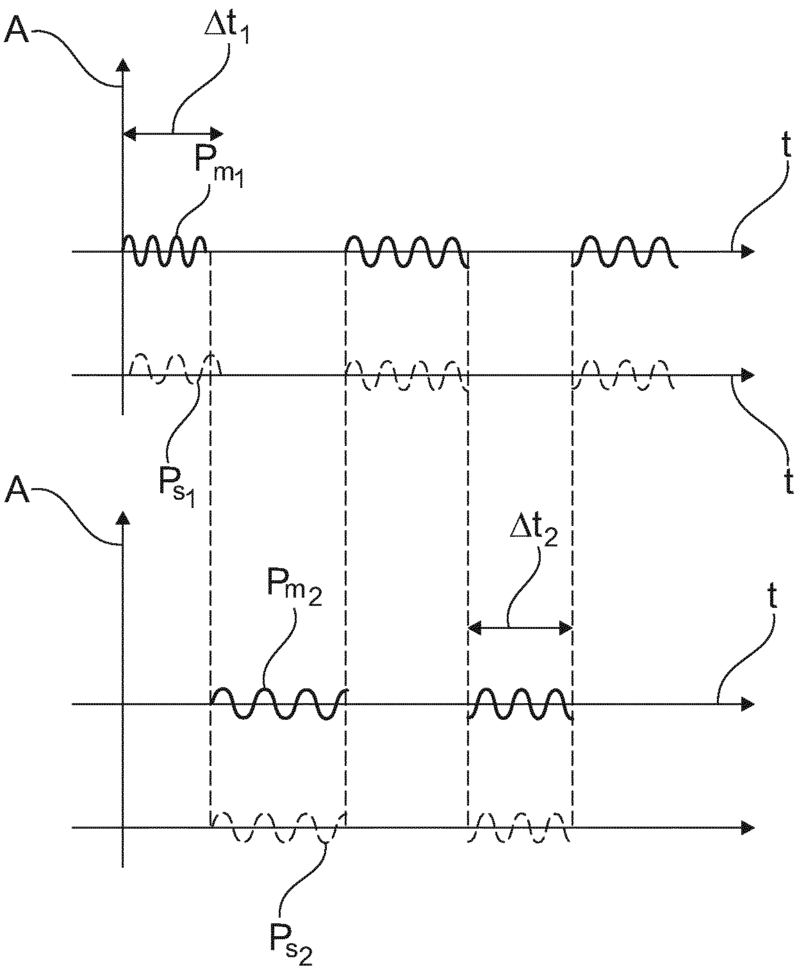

In a fourth example of implementation, the master and slave signals supplied to the first, respectively second, group of electrodes can be provided as wave packet. Notably, as illustrated on FIG. 5, when master Pm1 and slave Ps1 wave packets are supplied to the corresponding electrodes of the first group, the electrodes of the second group are off, no electric signal being supplied to them. The supply of the electric signal can be alternating between supplying the first group of electrodes with wave packets, the electrodes of the second group being off, then followed by supplying the second group with master $Pm_2$ and slave $Ps_2$ wave packets, and the electrodes of the first group being off, and so on. Notably, wave packets can be supplied to the second group of electrodes as soon as the supply of wave packets to the first group of electrodes to the first packet has ended, and vice versa, as illustrated on FIG. 5.

In particular, the duration $\Delta t_1$, respectively $\Delta t_2$ between supplying two consecutive wave packets to the first, respectively second group of electrodes, can be lower than the hydrodynamic reaction time of the object. The hydrodynamic reaction time can be easily determined by a skilled worker from the size of the object and the viscosity of the fluid medium which embeds the object.

Notably, the sum $\Delta t_1+\Delta t_2$ of the duration of the wave packet supplied to the first group of electrodes and of the duration of the wave packet supplied to the second group of electrodes is lower than the hydrodynamic reaction time of the object.

Figure 6:
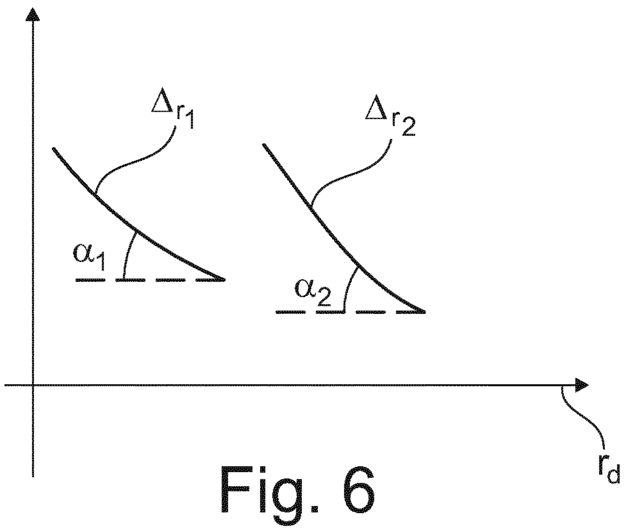
FIG. 6 illustrates the evolution of the radial step between consecutive tracks of electrodes of the first and second group, depending on the radial distance $r_d$ to the spiral axis, according to a second example of device of the invention.

The example illustrated on FIG. 1 is notably characterized by consecutive tracks of the electrodes of the first, respectively second, group being separated by a constant radial step. In a variant illustrated on FIGS. 6 and 7, the tracks of the electrodes of the first, respectively second, group are arranged on the substrate such that the radial step $\Delta r_1$, respectively $\Delta r_2$ between two successive tracks decreases radially from the spiral axis, along a radial direction $r_d$.

Furthermore, and notably in order to supply the device according to the third example of implementation described here above, the radial decrease $\alpha_1$, $\alpha_2$ of the radial step can be different between the two groups of electrodes. The tracks of the first and second groups of electrodes each draw a line along a polar coordinate $R(\theta)$, being obtained by solving the equation (i) described here above.

Figure 7:
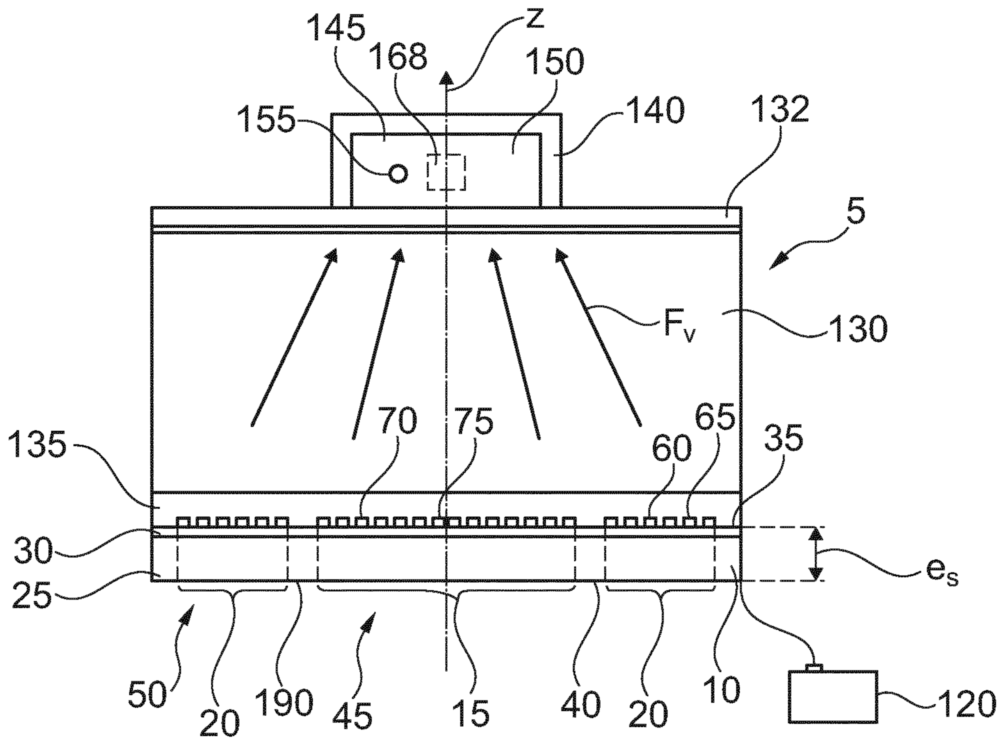
FIG. 7 is a cross section view of the second example of electroacoustic device.

In the example of FIG. 7, the first and second groups each comprise two hot electrodes 60, 65, 70, 75 provided on the face of the device which faces the support. The hot electrodes of each group are supplied with out of phase electric signals.

Furthermore, the device comprises a ground electrode 190, arranged on the lower face 40 of the substrate. The ground electrode is connected to a ground socket of the power supply apparatus. It overlaps both the first and second grounds electrodes.

When powering the hot electrodes (not represented for clarity reasons), the first and second wave transducers are deformed by volume ultrasonic waves propagating substantially along a direction parallel to the spiral axis, in the piezoelectric substrate.

The wave transducers transmit the volume ultrasonic waves to the bulk of the support wherein they define a focalized ultrasonic vortex Fv which focal locus (wherein the acoustic intensity is the lowest) is located in the cavity 145. By displacing the base relatively to the support, the object can be brought close to the focal locus. It can then be manipulated and notably be entrapped along the spiral axis.

Figure 8:
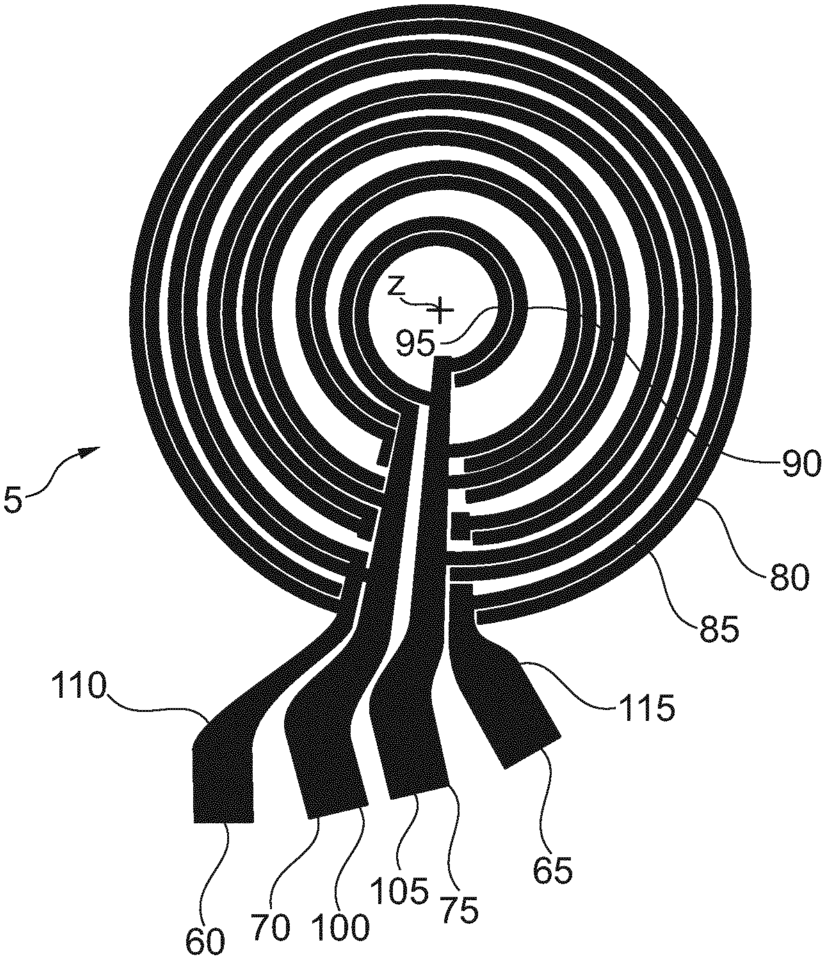
FIG. 8 is a front view of another example of device.

The device illustrated on FIG. 8 differs from the device illustrated on FIG. 1 by the fact that the tracks of the electrodes of the first and second groups are interdigitated the one with another.

Notably, a group of two tracks of different polarity of the second group of electrodes are arranged radially between two different groups of tracks of different polarity of the first group of electrodes and vice versa. In this embodiment, the rings intensity of the two counter rotating vortices synthesized by the first and second group of electrodes can be more similar, which is desirable when equilibrating the master electrical signals to control the speed of rotation of the object.

The arrangement on the substrate of the contact brushes 100, 105 and tracks 90, 95 of the electrodes of the first group prevents any continuous extension of the contact brushes 110, 115 of the electrodes of the second group along a substantially radial direction such as to connect the corresponding tracks.

Figure 9:
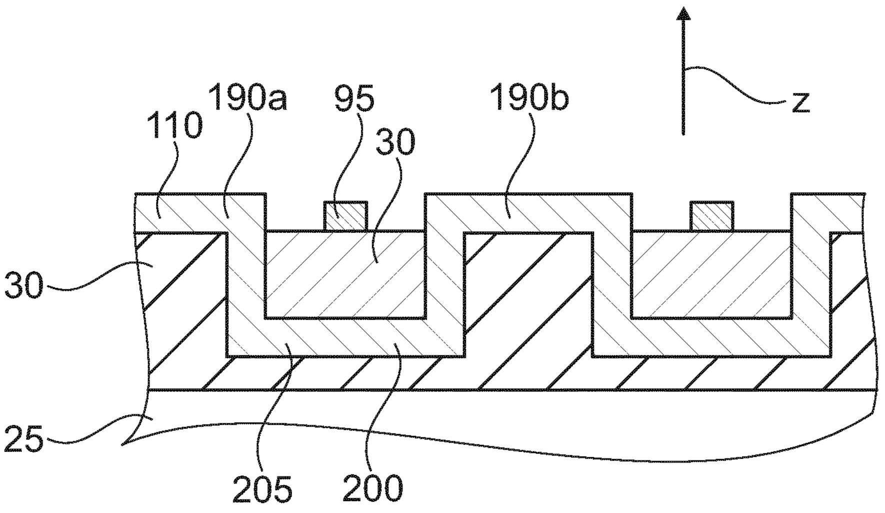
FIG. 9 is a cross section view in a plane containing the spiral axis of the device illustrated on FIG. 8.

As it can be observed on FIG. 9, the contact brush 110 of one of the electrodes of the second group is provided on a face of the piezoelectric part 25. Two portions $\mathbf{190}_{a\text{-}b}$ of the contact brush are provided on top of the dielectric layer 30 from either side of one track 95 of the electrode 75 of the first group. The two portions $\mathbf{190}_{a\text{-}b}$ are connected with respective tracks 80 of the electrode 60 of the second group. The two portions $\mathbf{190}_{a\text{-}b}$ are connected the one with the other by a buried portion 200 which follows a track defined by a tunnel 205 formed in the dielectric layer. The buried portion is provided at a distance from one track of the first electrode, by a portion of the dielectric layer.

The manufacture of the buried portion of the dielectric layer can be performed by selective etching of the silica dielectric layer followed by deposition of an alloy or a metal such as to form the respective portions of the contact brush.

Figure 10:
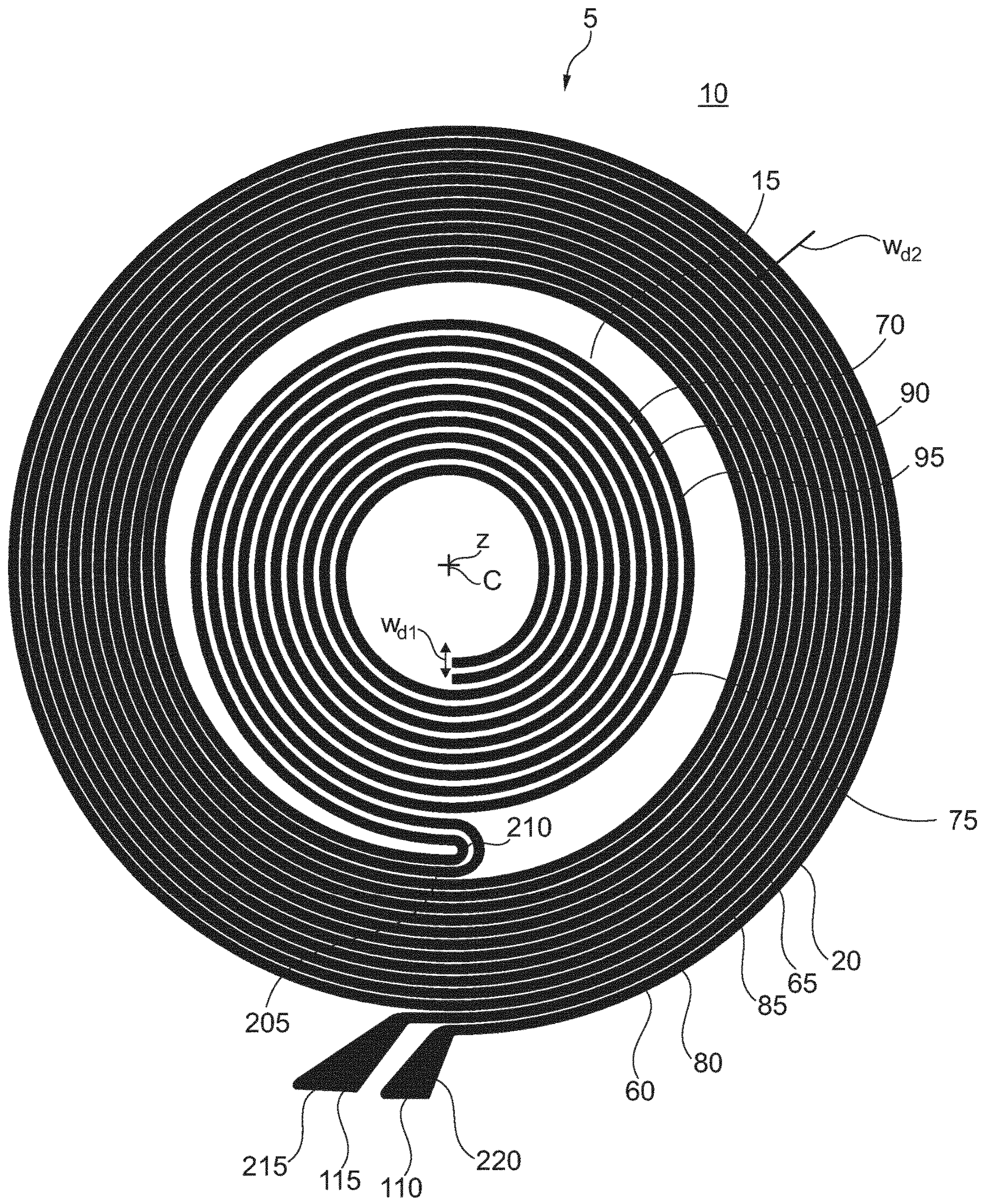
FIG. 10 is a front view of another example of the device.

FIG. 10 shows another example of the device 5 according to the invention. It comprises first and second groups of electrodes.

The first 15 group of electrodes is arranged radially inner to the second group 20 of electrodes.

The first group of electrodes comprise two electrodes 90, 95 each consisting in a single track comprising five coils. The second group of electrodes comprises two electrodes 80, 85 each comprising a single track comprising seven coils. Each electrode of the second group of electrodes comprises a single track and a contact brush 110, 115, the track being connected to the contact brush by one its end 205, 210. Further, the track of each electrode of the second group is connected by its opposite end 215, 220 to the track of one of the electrodes of the first group.

Thus, the track of one of the electrodes of the first group and the track of one of the electrodes of the second group are connected together to the contact brush of the electrode of the second group and the track of the other electrode of the first group and the track of the other electrode of the second group are connected together to the contact brush of the electrode of the first group.

Thus, when a current is supplied to an electrode of the second group through the corresponding contact brush, it is also supplied to the corresponding electrode of the first group.

In addition, the width $w_{d1}$ of the track of each electrode of the first group is different from the width $w_{d2}$ of the track of the corresponding electrode of the second group to which the electrode of the first group is connected. Providing tracks of electrodes of first and second groups having different widths results in first and second wave transducers presenting different reasoning frequencies.

By selecting an appropriate frequency of the electric master and slave signals supplied to the first and second groups of electrodes, the rotation of the object which is submitted to the acoustic wave generated by the device can be controlled, and notably prevented.

Figure 11:
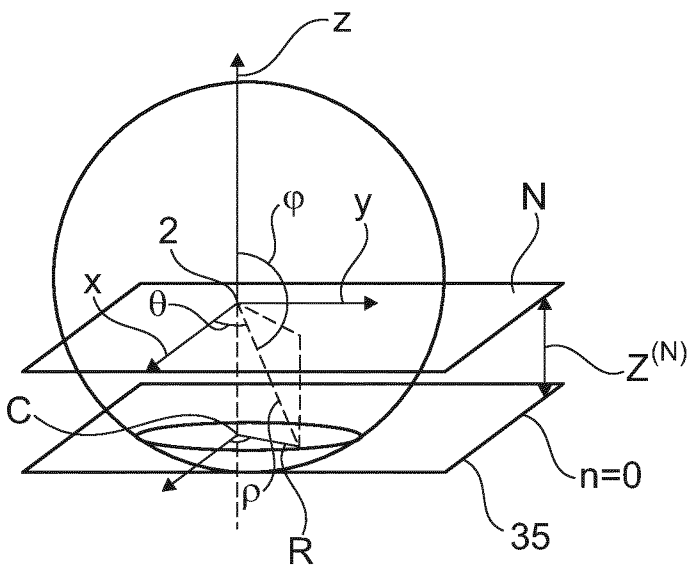
FIG. 11 illustrates the definition of reference points for expressing equations (i) to (x)

FIG. 11 illustrates the location of a Cartesian coordinate system for defining a spherical vortex such as for instance defined by equation (x), which focal locus is referred by point 2 and intercepts the plane, referred by n=0, on which the electrodes are provided, for instance being the upper face 35 of the piezoelectric part.

Figure 12:
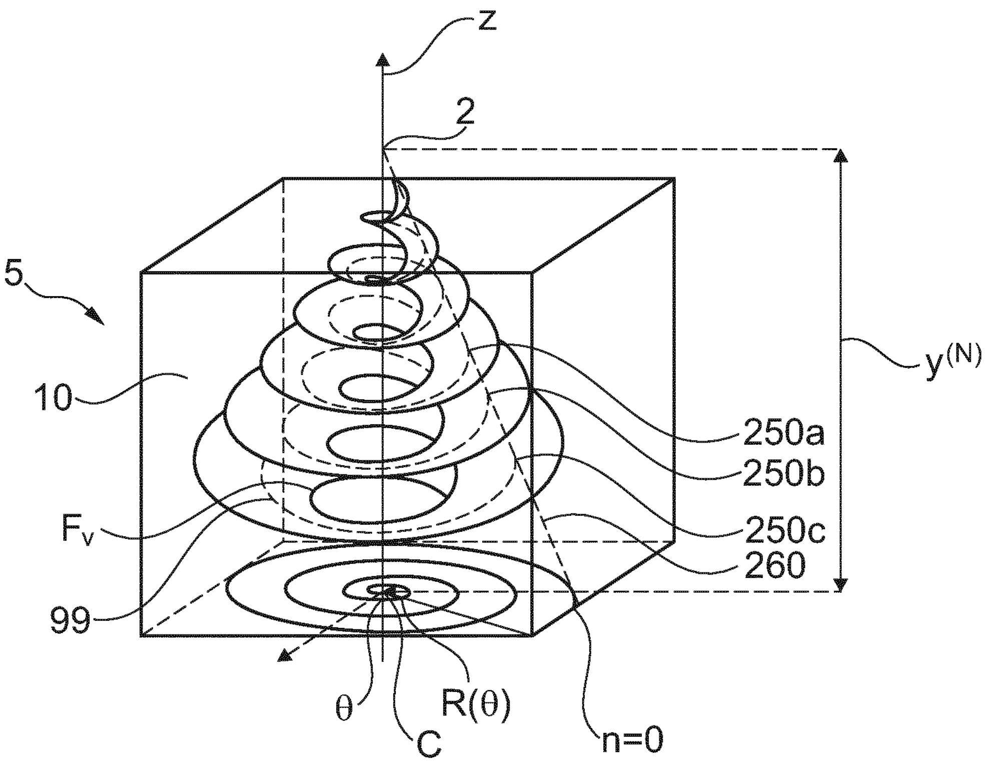
FIG. 12 illustrates a method implemented to define the specific shape of a hot electrode for generating a focalized ultrasonic wave according to the second specific embodiment of the invention.

FIG. 12 aims at illustrating the resolution of equations (i) to (vii), in the case the vortex Fv propagates in the support from the hot track towards the focal locus 2 over a distance $z^{(N)}$ along axis Z. The vortex Fv comprises 3D lines along which the phase is constant, named equi-phase lines. For instance, along an equi-phase line 99, the phase of the vortex is the same at points 250$a$ to 250$c$. The projection, along the line 260 that joins the focal locus 2 and points 250$a$ to 250$c$, of equi-phase line is a plane line which is set by parameter $R(\theta)$ expressed from the center C on the surface where the tracks are provided. In other words, the intersection of the phase of the focalized ultrasonic vortex onto the plane where the hot track has to be provided yields the drawing of the hot track. This is for instance mathematically expressed by the set of equations (i) to (viii). By forming at least one hot track drawing said line $R(\theta)$, an ultrasonic vortex focalizing at focal point 2 can be generated.

As it appears throughout the present description, the device according to the invention improves the efficiency of manipulating an object embedded in a fluid medium, by controlling its rotation when the object is entrapped. It further improves the selectivity, when manipulating a specific object among a population of objects.

Of course, the invention is not limited to the specific embodiments detailed in the present description.

The invention claimed is:

1. An electroacoustic device for generating an acoustic wave, comprising:

a piezoelectric substrate;

first electrodes arranged on the piezoelectric substrate, each first electrode comprising first tracks; and second electrodes arranged on the piezoelectric substrate, each second electrode comprising second tracks, wherein, the first tracks spiral around a spiral axis in a first winding direction, and the second tracks spiral around the spiral axis in a second winding direction opposite to the first winding direction.

2. The electroacoustic device of claim 1, wherein the first electrodes each comprise a first contact brush arranged on the piezoelectric substrate and connected to corresponding first tracks.

3. The electroacoustic device of claim 2, each first contact brush is electrically connected to one of the second tracks.

4. The electroacoustic device of claim 1, wherein the second electrodes each comprise a second contact brush arranged on the piezoelectric substrate and connected to corresponding second tracks.

5. The electroacoustic device of claim 4 the first tracks are arranged remotely from the second contact brushes.

6. The electroacoustic device of claim 4, wherein the second tracks extend from the second contact brushes to corresponding ones of the first tracks.

7. The electroacoustic device of claim 3, the wherein:

one of the second tracks is partially superimposed on one of the first contact brushes; and/or one of the first tracks is partially superimposed on one of the second contact brush.

8. The electroacoustic device of claim 1, wherein the acoustic wave is a swirling surface acoustic wave propagating in the piezoelectric substrate.

9. The electroacoustic device of claim 8, further comprising a support acoustically coupled with the piezoelectric substrate, the electroacoustic device being further configured such that the swirling surface acoustic wave is transmitted to the support and propagates in the support as an acoustic vortex.

10. The electroacoustic device of claim 1, wherein:

the acoustic wave is a focused acoustic vortex propagating in the piezoelectric substrate; or the electroacoustic device further comprises a support acoustically coupled with the piezoelectric substrate, the acoustic wave being a focused acoustic vortex that propagates in the support; or the acoustic wave is a focused acoustic vortex that propagates in a fluid medium acoustically coupled with the electroacoustic device.

11. A process for manipulating an object embedded in a fluid medium, the process comprising:

generating an acoustic vortex or a focused acoustic vortex using the electroacoustic device of claim 1;

propagating the acoustic vortex or the focused acoustic vortex in the fluid medium to create a radiation pressure to entrap the object; and manipulating the object by displacement of the first and second electrodes relatively to the fluid medium.

12. The process of claim 11, wherein the manipulating the object comprises:

rotating the object; and/or translating the object.

13. A process comprising:

generating an acoustic vortex or a focused acoustic vortex using the electroacoustic device of claim 1; and propagating the acoustic vortex or the focused acoustic vortex in a fluid medium to generate a vortical flow of the fluid medium.

14. The process of claim 11, wherein the generating an acoustic vortex or a focused acoustic vortex comprises electrically supplying:

a first master signal to a first one of the first electrodes;

a first slave signal to a second one of the first electrodes;

a second master signal to a first one of the second electrodes; and a second slave signal to a second one of the second electrodes.

15. The process of claim 14, wherein the amplitude of the first master signal and/or of the first slave signal is different from an amplitude of the second master signal and/or of the second slave signal.

16. The process of claim 11, wherein:

the first electrodes and the second electrodes at least partially define respective first and second wave transducers having different resonance frequencies; and the generating an acoustic vortex or a focused acoustic vortex comprises supplying master and slave electric signals adapted for exciting the first and second wave transducers with a frequency ranging between the resonance frequencies of the first and second wave transducers.

* * * * *